United States Patent [19]
Prestigiacomo

[11] Patent Number: 5,363,751
[45] Date of Patent: Nov. 15, 1994

[54] FLAME SUPPRESSANT MARINATING GRILL OVERLAY

[76] Inventor: Nick J. Prestigiacomo, 965 Old Kings Rd., Holly Hill, Fla. 32117

[21] Appl. No.: 11,005

[22] Filed: Jan. 29, 1993

Related U.S. Application Data

[63] Continuation-in-part of Ser. No. 798,188, Nov. 26, 1991, Pat. No. 5,242,704.

[51] Int. Cl.$^5$ .......................... A23L 1/00; A47J 37/06; A47J 37/07
[52] U.S. Cl. ........................................ 99/444; 99/425; 99/445; 99/450
[58] Field of Search .......... 99/375, 400, 425, 444–446, 99/447, 449, 450; 126/25 R, 41 R, 152 R, 152 B, 163 R, 214 C; 426/523, 296

[56] References Cited

U.S. PATENT DOCUMENTS

| | | | |
|---|---|---|---|
| 324,421 | 8/1885 | Smead | 126/163 R |
| 709,048 | 9/1902 | Sausser | 99/450 |
| 833,529 | 10/1906 | Jones | 99/445 |
| 850,654 | 4/1907 | Jones | 99/445 |
| 1,066,552 | 7/1913 | Taylor et al. | 99/450 |
| 1,956,387 | 4/1934 | Hartman | 99/446 |
| 2,652,766 | 9/1953 | Cralle | 99/450 |
| 3,199,438 | 8/1965 | Myler et al. | 99/450 |
| 3,292,528 | 12/1966 | Myler | 99/446 |
| 5,211,105 | 5/1993 | Liu | 99/446 |
| 5,259,299 | 11/1993 | Ferraro | 99/340 |

FOREIGN PATENT DOCUMENTS

| | | | |
|---|---|---|---|
| 424546 | 1/1911 | France | 99/445 |
| 344406 | 11/1921 | Germany | 126/163 R |

Primary Examiner—Timothy F. Simone
Attorney, Agent, or Firm—Paul S. Rooy

[57] ABSTRACT

A flame suppressant marinating grill overlay and method of use having raised outer edges, gutters and ridges, said ridges being disposed between said gutters. The ridges contain holes. The flame suppressant marinating grill overlay is placed over the cooking surface of a conventional barbecue grill, food is placed on top of the flame suppressant marinating grill overlay and the conventional barbecue grill is operated as usual. The gutters collect accumulated food juices which serve to marinate the food being cooked and prevent the food from drying out. Excess food juices may escape through the holes contained in the ridges. The flame suppressant marinating grill overlay also serves to protect the food being cooked from burning due to flare-ups.

5 Claims, 3 Drawing Sheets

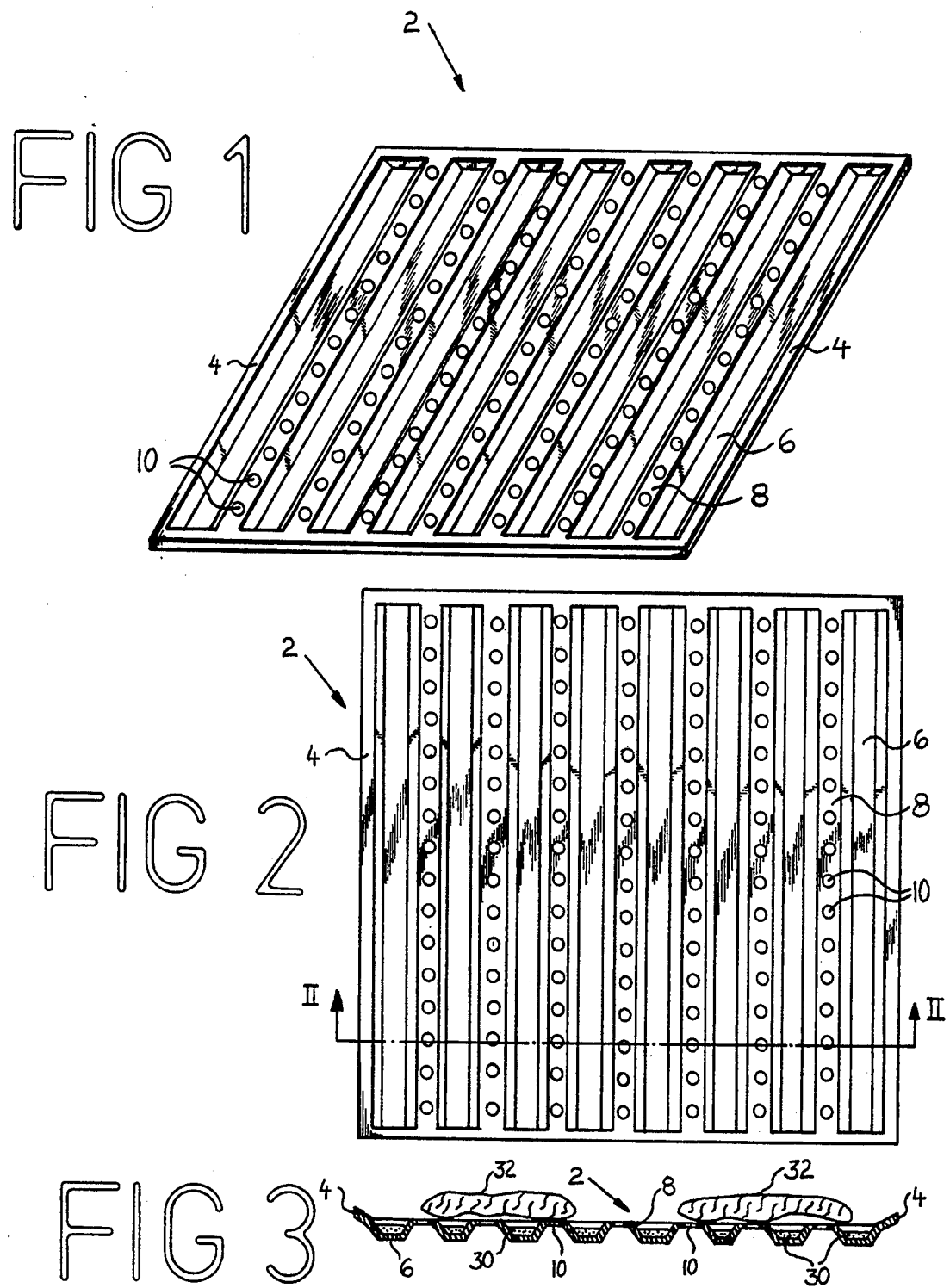

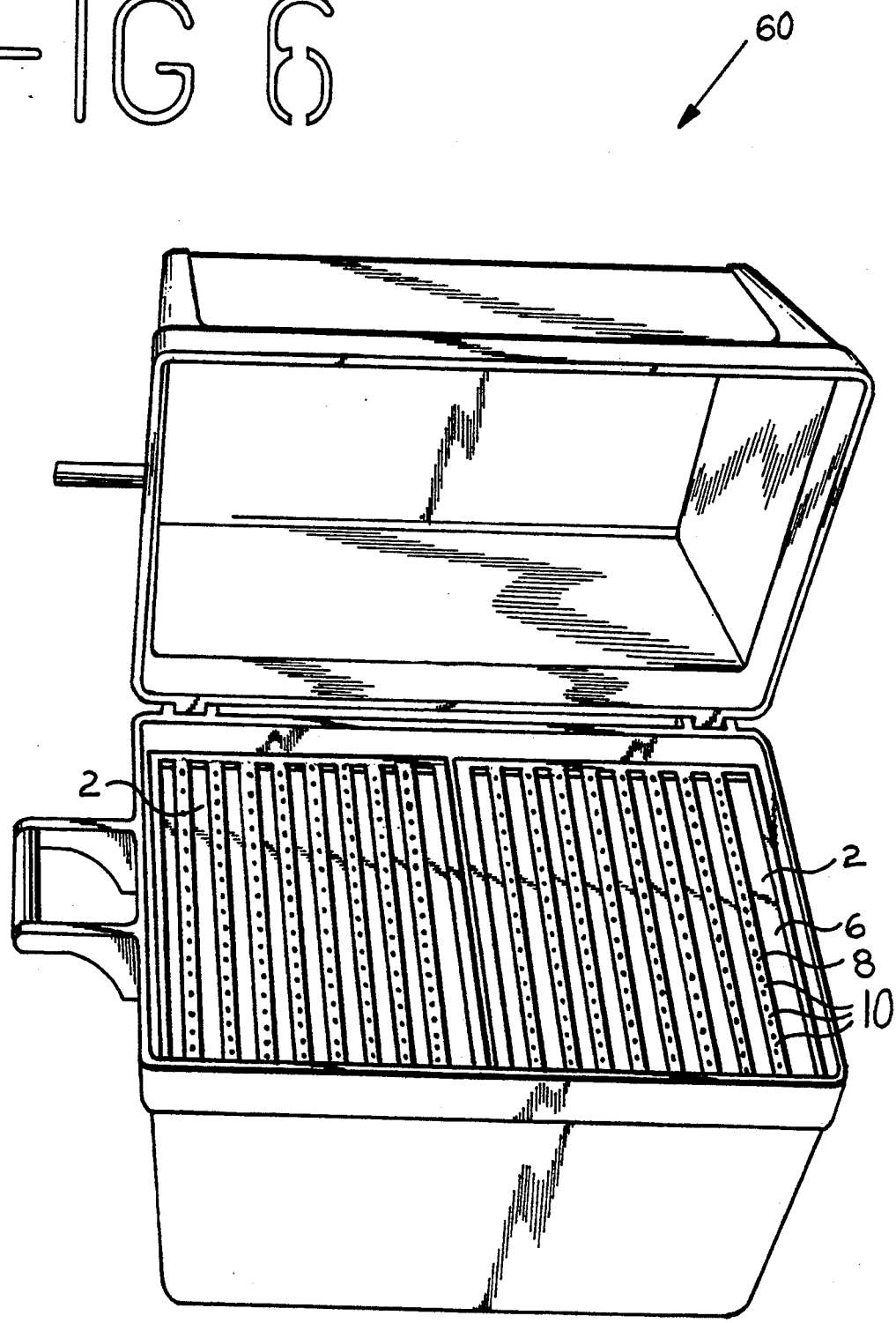

FLAME SUPPRESSANT MARINATING GRILL OVERLAY

This application is a continuation in part of patent application Ser. No. 07/798,188 filed Nov. 26, 1991, U.S. Pat. No. 5,242,704.

1. Field of the Invention

The present invention relates to cooking tools and in particular to a flame suppressant marinating grill overlay.

2. Background of the Invention

Cooking foods on the barbecue grill is a popular method of food preparation around the world, be it at home or in a more commercial environment such as a restaurant or cafeteria. Most barbecue grills comprise a heat source such as a wood, charcoal or gas fire, and a grill suspended over said heat source. This grill serves as a means to support the food being cooked over the heat source. Foods typically grilled in this way include chicken, beef, pork, etc.

There are a number of problems associated with preparing food in this fashion. First, as the juice of whatever is being cooked is generally lost into the fire through the spaces in the grill, the danger exists that the food being cooked will dry out and become tough. Another problem is that the juice that drips down into the fire is generally flammable animal fat. When sufficient juices drip into the fire, a flareup will occur, bathing the food being cooked in flames. This accelerates the aforementioned drying out process and also imparts a black color and bitter taste to the outside of the food being cooked.

DESCRIPTION OF THE PRIOR ART

A number of approaches have been taken towards solving the above problems. Latour et al. in U.S. Pat. No. 4,979,440 teaches a BBQ Grill Insert with funnel shaped holes that would allow the food juices to drip down into the fire. The insert would serve as a flame shield to prevent the outside of the food being cooked from being burned. While a flame shield is thus provided, Latour disclosed no way of overcoming the drying out problem inherent in this juice loss.

In U.S. Pat. No. 4,428,281 Miller discloses a grill with a multiplicity of openings which food juices would be able to drip through. In addition, Miller's grill would slope towards a trough disposed at one extreme of this grill whereby excess juices would be caught and retained for disposal. No method is disclosed, however, whereby the food drying out during the cooking process might be avoided.

U.S. Pat. No. 3,552,302 was granted Gilberg for a barbecue design which incorporates slots cut into a solid sheet. The solid sheet would serve as a flame shield, and the slots would allow the food juices to drip into the fire. With this design, the problem of food drying out is neither addressed nor solved.

SUMMARY OF THE INVENTION

Accordingly, it is an object of this invention to provide a flame suppressant marinating grill overlay capable of protecting the food being cooked from the flames which may result when juices drip down into the fire.

It is a further object of this invention to provide a flame suppressant marinating grill overlay capable of retaining a portion of the food juices which will marinate the lower surface of the food being cooked, thereby preventing the food being cooked from drying out.

It is still a further object of this invention to provide a flame suppressant marinating grill overlay constructed of materials which are easy to clean following use.

It is a further object of this invention to provide a flame suppressant marinating grill overlay at a low enough cost to render it commonly affordable.

It is still a further object of this invention to provide a flame suppressant marinating grill overlay which will readily fit commonly available grills so as to provide for easy installation and removal of the flame suppressant marinating grill overlay.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1, 2 and 3. Sheet two contains FIGS. 4 and 5. Sheet three contains FIG. 6.

FIG. 1 is a front isometric view of the flame suppressant marinating grill overlay.

FIG. 2 is a top view of the flame suppressant marinating grill overlay.

FIG. 3 is a cross sectional view of the flame suppressant marinating grill overlay taken at section II—II of FIG. 2. Food 32 and food juices 30 have been added to this view.

FIG. 6 is a front isometric view of two flame suppressant marinating grill overlays installed side by side in a conventional barbecue grill.

DETAILED DESCRIPTION OF THE PREFERRED EMBODIMENT

Figure 4:
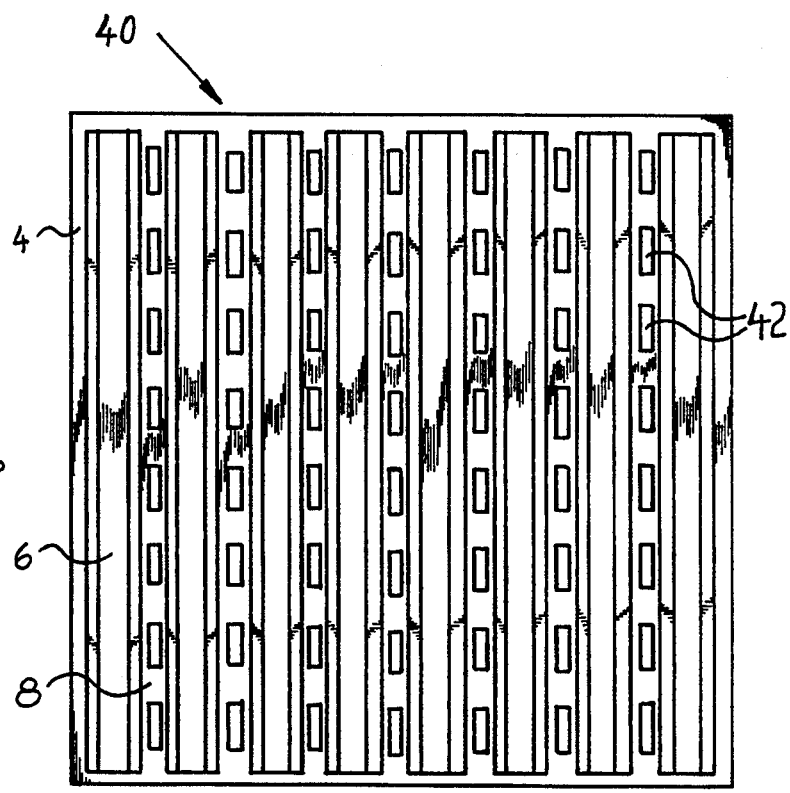
FIG. 4 is a top view of an alternate embodiment of the flame suppressant marinating grill overlay.

Referring now to FIG. 1 we can observe a front isometric view of a flame suppressant marinating grill overlay 2. Raised outer edges 4 are disposed around the perimeter of the flame suppressant marinating grill overlay 2 in order to keep a portion of the food juices 30 within gutters 6. Ridges 8 serve to support the food 32 being cooked. Gutters 6 are provided with holes 10 wherethrough excess food juices 30 may drip.

FIG. 2 is a top view of a flame suppressant marinating grill overlay 2. We can observe raised outer edges 4, gutters 6, and ridges 8 containing holes 10.

FIG. 3 is a cross sectional view of the flame suppressant marinating grill overlay 2 taken at section II—II of FIG. 2. Food 32 and food juices 30 have been added to this view.

We can see raised edges 4 constraining food juices 30 within gutters 6. When the level of food juices 30 raises above ridges 8, these food juices 30 may drip through holes 10. Food 32 is also visible in this view.

FIG. 4 is a top view of an alternate embodiment of the instant invention, the slotted flame suppressant marinating grill overlay 40. Holes 10 have been replaced by slots 42; raised outer edges 4, gutters 6 and ridges 8 remain.

Figure 5:
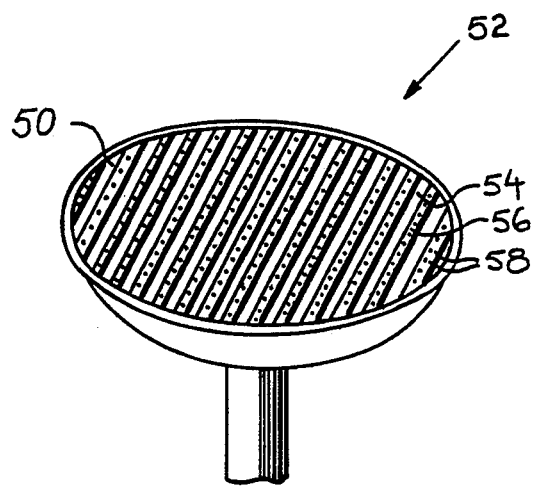
FIG. 5 is a front isometric view of an alternate embodiment of the flame suppressant marinating grill overlay installed on a conventional circular barbecue grill.

FIG. 5 is a front isometric view of still another embodiment of the instant invention, the circular flame suppressant marinating grill overlay, installed atop a conventional circular barbecue grill 52.

Gutters 54, ridges 56 and holes 58 fulfill the same functions as in the preferred embodiment.

FIG. 6 is a front isometric view of 2 flame suppressant marinating grill overlays 2 installed side by side on a conventional barbecue grill 60. Gutters 6, ridges 8 and holes 10 are also visible.

Installation and Method of Use

The flame suppressant marinating grill overlay 2 is sized so as to be able to be placed on top of a conventional circular barbecue grill 52 or conventional barbecue grill 60 directly on top of the grill already existent. No fasteners or tools are required.

In operation, food 32 is placed on top of the flame suppressant marinating grill overlay and cooked as usual, operating the conventional barbecue grill 60 or the conventional circular barbecue grill 52 in the normal fashion.

Food juices 30 will accumulate in gutters 6 and serve to bath the lower surface of food 32 with moisture (seasoned to taste), thus avoiding that food 32 becomes dried out and simultaneously providing a marinating effect which serves to enhance the flavor of the food 32 being cooked according to the tastes of the chef. In this manner not only the texture but also the flavor of the food 32 being cooked is enhanced.

Excess food juices 30 are free to drip through holes 10. The flame suppressant marinating grill overlay prevents the resulting flameups from burning food 32.

While a preferred embodiment of the invention has been illustrated herein, it is to be understood that changes and variations may be made by those skilled in the art without departing from the spirit and scope of the appending claims.

I claim:

1. A flame suppressant marinating grill overlay comprising:

raised outer edges disposed around a perimeter of said flame suppressant marinating grill overlay whereby food juices may be constrained;

gutters comprising a flat continuous surface disposed within said raised outer edges wherein food juices may accumulate;

ridges comprising a flat top surface disposed between said gutters; and holes disposed within said flat top surface wherethrough excess food juices may escape.

2. The flame suppressant marinating grill overlay of claim 1 wherein the flame suppressant marinating grill overlay's top view shape is rectangular.

3. The flame suppressant marinating grill overlay of claim 1 wherein the flame suppressant marinating grill overlay's top view shape is circular.

4. The flame suppressant marinating grill overlay of claim 1 wherein the top view shape of said holes is circular.

5. The flame suppressant marinating grill overlay of claim 1 wherein the top view shape of said holes is rectangular.

* * * * *